April 7, 1970   R. T. BYERLY ET AL   3,505,505
VOLT-AMPERE DEVICE
Filed Oct. 22, 1965

WITNESSES:
Bernard R. Gregory
James F. Young

INVENTORS
Richard T. Byerly and
John Kostalos, Jr..
BY C. L. Freedman
ATTORNEY

United States Patent Office 3,505,505
Patented Apr. 7, 1970

3,505,505
VOLT-AMPERE DEVICE
Richard T. Byerly and John Kostalos, Jr., Pittsburgh, Pa., assignors to Westinghouse Electric Corporation, Pittsburgh, Pa., a corporation of Pennsylvania
Filed Oct. 22, 1965, Ser. No. 501,238
Int. Cl. G06f 15/20; G01r 7/00
U.S. Cl. 235—151.31
10 Claims

ABSTRACT OF THE DISCLOSURE

First pulses $x_1$ representing watthours and second pulses $x_2$ representing varhours are supplied as inputs to logic circuitry. The logic circuitry is designed to respond to any combination of input pulses which may be combined by the expression $\sqrt{x_1^2+x_2^2}$ to equal substantially a predetermined value for the purpose of delivering a third pulse representing volt-ampere hours. The third pulses are counted for a period of time.

This invention relates to electrical measuring instruments and in particular to instruments for determining the volt-amperes in an electrical circuit.

As is well known in the electrical industry the current which electrical public utilities may be called upon to supply to a customer may be considered to comprise two components, a watt component in phase with the line voltage, and a wattless, or reactive, component in quadrature therewith. When a watt meter or watthour meter measures the input at the customer's premises, the watt component alone is registered, and the reactive component, no matter how large, is not accounted for. Particularly in the case of large customers, leaving the reactive current out of account would place a heavy burden on the utility, since both watt and wattless components play a part in determining the size and expense of electric generators and other elements in the utility's system. Hence many utilities now install at many points on their systems, for example the premises of a large customer, in addition to kilowatt hour (i.e. KWH) meters which account for watt current, other meters called reactive kilovolt ampere hour (i.e. KVARH) meters which account for reactive current.

In accordance with the invention first pulses $x_1$ are produced representatives of KWH and second pulses $x_2$ are produced representative of KVARH in a conventional manner. Thus, each first pulse $x_1$ represents a predetermined value of KWH and each second pulse $x_2$ represents a predetermined value of KVARH. For present purposes it will be assumed that each pulse $x_1$ and $x_2$ represent one KWH and one KVARH respectively. Pursuant to the invention these pulses are logically examined and any combination of first and second pulses corresponding to, or approximately corresponding to, a predetermined value of $\sqrt{x_1^2+x_2^2}$ or KVAH then produces a third pulse. The third pulses then may be counted for any desired period to indicate KVAH for such period. Turning now to FIG. 1 which is a vector diagram showing $x_1$ or KWH plotted as abscissa and $x_2$ or KVARH plotted as ordinates, vertical lines are drawn for each integral value which $x_1$, may take and horizontal lines for each corresponding value of $x_2$. Thus combinations of $x_1$ and $x_2$ are represented by the various intersections of abscissa and ordinates up to limits of 5. It will be noted that such intersections which lie at a vector distance from the origin 0 equal to $\sqrt{x_1^2+x_2^2}$ lie at the vector distance of exactly 5 for $x_1$, $x_2$ coordinate pair combinations 0, 5; 3, 4; 4, 3 and 5, 0; that the pairs 1, 5 and 5, 1 intersections have vector distances equal to $\sqrt{26}$ which exceeds 5 by only 0.10; and that for the pairs 5, 2 and 2, 5 the value of $\sqrt{x_1^2+x_2^2}=\sqrt{29}$ differs from 5 by 0.39.

Many purposes of utilities will be sufficiently served by data having the precision of the foregoing figures and this offers the possibility of using a reporting device which emits an output signal, e.g. an electric pulse every time an $x_1$, $x_2$ pair has any of the values listed in the preceding paragraph. Even for purposes where the error due to the $x_1$, $x_2$ pair combinations 5, 2 and 2, 5 would be too great to tolerate, an arrangement sending out a signal for occurrence of any pair except 5, 2 and 2, 5 and provided with means for correcting the error due to the latter, would be useful.

The present invention comprises an arrangement for effecting such purposes. Each output pulse would then represent $\sqrt{x_1^2+x_2^2}=5$ KVAH, and may report to a central office the KVAH flow at the location of the KWH and KVARH meters.

One object of this invention is accordingly to derive separate electric pulses respectively indicative of the KWH and the KVARH passing a point in a power system and to derive logically the KVAH represented thereby.

Another object is to receive separate electric signals respectively indicative of the power and the reactive power passing a point in an electric circuit and to register a quantity proportional to the product of potential, current and time corresponding thereto.

Another object is to receive separate electric signals respectively proportional to the watt current and the wattless current passing a point in an electric circuit and to register a quantity proportional to the resultant current corresponding thereto.

Still another object is to receive separate electric signals respectively indicative of the watt current and the wattless current passing a point in an electric network during a predetermined time and to record a quantity indicative of the resultant current corresponding thereto.

A further object is to provide a comparatively inexpensive and effective apparatus for reporting the KVAH of an electric circuit when furnished with binary-number reports of KWH and KVARH.

These and other objects of this invention will be evident upon reading the following description taken with the drawings in which is:

Figure 1:
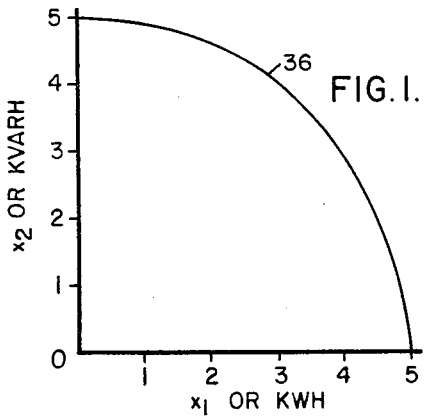
FIG. 1 is a vector diagram used in explaining this invention.
Figure 2:
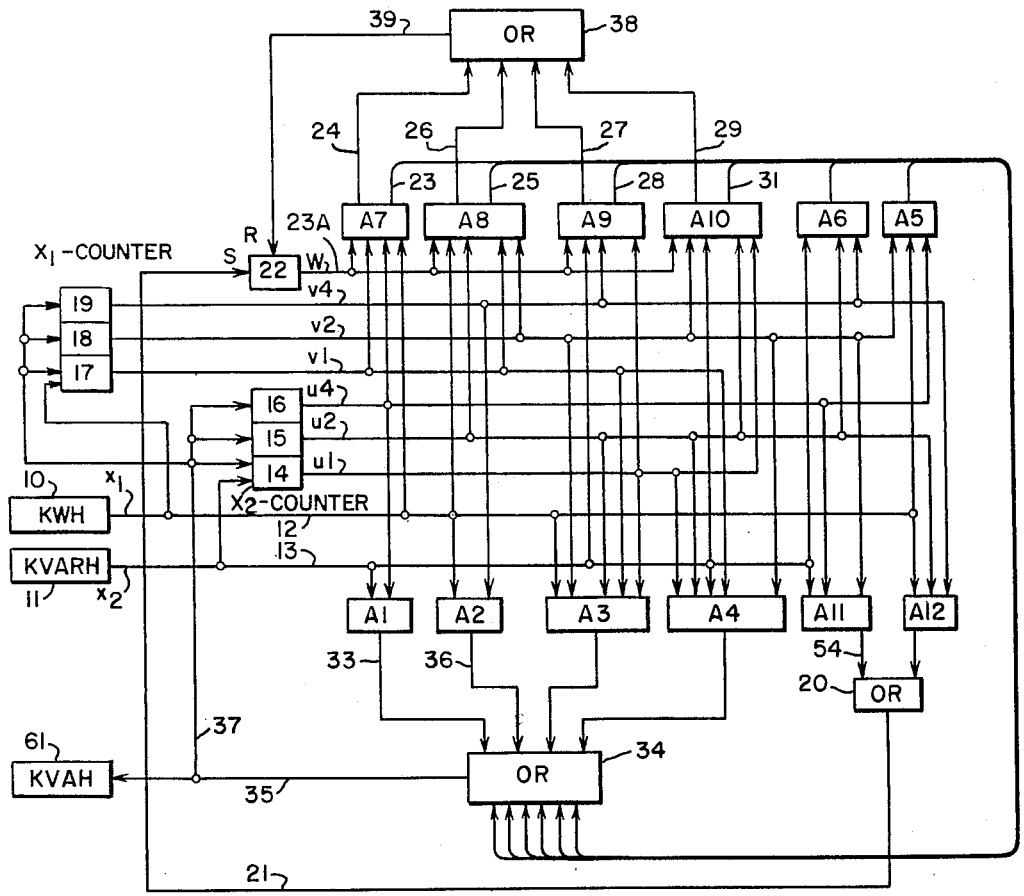
FIG. 2 is a schematic diagram of circuits in which the invention may be embodied.

FIG. 1 having already been discussed in detail, FIG 2 will next be described. A kilowatt hour (KWH) meter 10, and kilovolt-reactive ampere hour (KVARH) meter 11 located together at any desired point on an alternating current electric circuit, such as an electric power system are connected by input lines or by carrier or radio channels 12 and 13, to certain members of a plurality of twelve "AND" gates A1 to A12, as shown in FIG. 2. The line 13 is first connected to the input of a 1 bit-unit (a bistable element e.g. a flip-flop 14) of a first binary counter having a 2 bit-unit 15, and a 4 bit-unit 16. Such counters are too well known to require detailed description but each bit-unit produces an output voltage when it registers 1, 2, or 4 input pulses $x_2$ as the case may be. The line 12 similarly connects to the input of the 1 bit-unit 17 of a second binary counter having a 2 bit-unit 18 and a 4 bit-unit 19. The line 12 carries $x_1$ signal pulses each representing a predetermined value of KWH that has flowed at the metering location, and the line 13 carries $x_2$ signal each representing a predetermined value, of KVARH that has flowed. The reading or output signal of bit-unit 14 at any time may be called $u1$; that of 15 may be called $u2$, and that of 16 may be called $u4$. Similarly the readings or output signals of bit-units 17, 18 and 19 may be called $v1$, $v2$ and $v4$.

Thus the first binary counter 14, 15, 16 and the second binary counter 17, 18, 19 each consists of a three-stage binary computer with the output terminals of the stages $u1$, $u2$, $u4$ for the first binary counter and $v1$, $v2$, $v4$ for the second binary counter collectively presenting the number of pulses $x_2$ or $x_1$ applied to the input of the associated counter.

Figure 3:
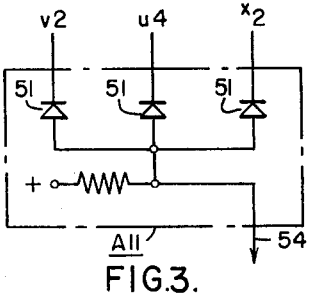
FIG. 3 is a schematic diagram of one "AND" gate suitable for use in the network of FIG. 2.

FIG. 3 shows a 3-input "AND" gate which may be taken as typical, except for the number of inputs, of all the twelve "AND" gates mentioned above. That of FIG. 3 is the "AND" gate A11 but it is believed that a detailed description of this will suffice to show how the other "AND" gates are made up. Each "AND" gate input-lead contains a diode 51, the inner terminals of these being joined through a common junction and a common resistor 52 to the positive terminal of a source of voltage (not shown) having its negative terminal grounded. The aforeside common junction in the "AND" gate is connected to an output-lead 54. The input leads on "AND" gate A11 are respectively connected to input channel 13 carrying KVARH signal pulses $x_2$, bit-unit 16 carrying output $u4$, and bit-unit 18 carrying output $v2$. Thus when, and only when, $x_2$, $u4$ and $v2$ all carry voltage will "AND" gate A11 open and transmit a voltage to its output lead 54. Such output voltage passes through an "OR" gate 20 and its output lead 21 to the "set" terminal of a bistable element (e.g. a flip-flop) 22 which produces a voltage on its output W only when "set." Output W is connected to one input of each of "AND" gates A7, A8, A9 and A10 which thus are closed against current flow except when bistable 22 is in its "set" condition. Likewise "AND" gate A12 has its 3 input leads connected respectively to the line 12 carrying KWH signal pulses $x_1$, bit-unit 15 carrying output $u2$ and bit-unit 19 carrying output $v4$. The "AND" gate A12 output transmits voltage through "OR" gate 20 and lead 21 to put bistable element 22 in "set" condition. A11 and A12 hold "AND" gates A7, A8, A9, and A10 closed against current flow to their output leads 23, 24, 25, 26, 27, 28, 29 and 31 except at times where three voltages $x_1$, $u4$, $v2$ or $x_2$ $u2$, $v4$ are all present.

Referring still to FIG. 2, the "AND" gate A1 has its input leads connected to input channel 13 and to 4 bit-unit output 16, and so is closed against current flow through its output lead 33 to "OR" gate 34 except when $x_2$ and $u4$ apply voltage to such "AND" gate. The result of this is that when the 4 bit-unit 16 stands energized to carry an output voltage by the previous arrival of 4 signal pulses from KVARH meter 11, the arrival of another signal pulse $x_2$ from that meter, thereby completing the energization of the "AND" gate A1 by the combination $x_2$, $u4$, causes an output pulse flow through "OR" gate 34 to its output channel 35, where it signals the passage at the metering point of KVAH corresponding to five pulses $x_2$. In similar wise the "AND" gate A2 has its two inputs connected against current flow through its output-lead 36 unless a KWH pulse arrives over input channel 12 at a time when 4 previously arriving pulses have energized 4 bit-unit 19. Upon that happening current can flow through output lead 36, "OR" gate 34 and output channel 35 to signal passage of KWH corresponding to five pulses $x_1$.

Reference to FIG. 1 will show that presence of voltage on 4 bit-unit 16, signifying previous arrival of 4 pulses from KVARH meter 11, can occur when $x_2=4$ and $x_1$, the number of pulses received from the KWH meter 10, is 0 and also when $x_1=1$. In the first case, arrival of another KVARH signal-pulse, the 5th, jumps the network status on the flow diagram of FIG. 1 straight up along the $x_2$ axis from 0, 4 to 0, 5 so that the latter point corresponds to emission of a KVAH signal over output channel 35. Similarly presence of voltage on bit-unit 19, corresponding to previous flow of 4 KWH units, may occur at either of FIG. 1 intersections 4, 0 or 4, 1 and in the first case arrival of a 5th KWH input pulse $x_1$ jumps the status along the $x_1$ axis from 4, 0 to 5, 0. But if, when the status of the network is represented by 1, 4 in FIG. 1, a 5th KVARH pulse arrives the network status will jump to intersection 1, 5. This status corresponds to passage at the metering point of $$KVAH = \sqrt{\overline{KWH^2} + \overline{KVARH^2}} = \sqrt{1^2 + 5} = \sqrt{26}$$

As previously pointed out this differs from 5 by an amount so small that, for many purposes, the discrepancy may be disregarded, and the status may be registered as 5 KVAH.

Similar considerations apply to treating the jump in system status from 1 when a 5th signal pulse arrives from the KWH meter, as indicative of 5 KWH pulses passing the metering point. In summary, the gates A1 and A2 operate whenever the fifth pulse of one of the trains of pulses $x_2$ or $x_1$ is received after the counters are reset, without regard to the other of the trains of pulses $x_1$ or $x_2$. Therefore "AND" gate A1, serves to send out over output channel 35 a KVAH signal when the system status is represented by either 0, 4 or 1, 4 and a 5th KVARH signal pulse $x_2$ arrives. "AND" gate A2 similarly correctly reports a system of either status 4, 0 or 4, 1 plus arrival of another $x_1$ pulse.

It will readily be seen that the system status must always be represented by one or another intersection of the abscissas and ordinates in FIG. 1; that the arrival of a KWH signal-pulse will always result in a jump of one integer magnitude along the abscissa $x_1$; and arrival of a KAVRH pulse will produce a one-integer jump along an ordinate $x_2$. Thus, for example, when the system status is 0, 4 a KWH pulse over input channel 12 may be the next to arrive from the metering point, resulting in a jump to system status 1, 4; but this will result in a KVAH value of only $$\sqrt{1^2 + 4^2} = \sqrt{17} = 4.12$$

which is so far removed from a value of 5 as not to warrant, for some utility's purposes, an output channel pulse recording of KVAH. This is in clear contrast to the effect of arrival of a KVARH pulse when the same system status 0, 4 exists, as has just been explained. Similar contrast is seen between the effects of the receipt of a KVARH signal pulse, and receipt of a KWH pulse, when the system status is 4, 0.

Examination of FIG. 1 will now show that, when the system status is represented by intersection 3, 3 arrival of a KWH signal pulse $x_1$ will cause a jump to intersection 4, 3 which corresponds exactly to a KVAH pulse value of $$\sqrt{4^2 + 3^2} = 5.00$$

atnd so warrants sending out a signal pulse over output channel 35. Similar considerations as to the receipt of a KVARH pulse $x_2$ when the system status 3, 3 exists warrant sending out a KVAH signal over that output channel.

"AND" gates A3 and A4 function respectively, when the system has the 3, 3 status, to send out a KVAH signal over output channel 35 upon receipt of a KWH signal $x_1$ or a KVARH signal $x_2$. When status 3, 3 exists counter bit-units 14 and 15 will stand energized to indicate $u=3$ (i.e. binary number 011), and bit-units 17 and 18 stand energized to represent $v=3$. Arrival of a KWH signal pulse $x_1$ over input channel 12 will then complete the opening of "AND" gate A3, and send a signal pulse out through "OR" gate 34 over output channel 35 indicating jump of the system to status 4, 3 in FIG. 1 or a value of one KVAH pulse.

For similar reasons arrival of a KVARH pulse $x_2$ over input channel 13 would have jumped the system status in FIG. 1 to 3, 4 and have completed the opening of "AND" gate A4 to send out an output KVAH pulse. The curve 36 in FIG. 1 is, of course, the locus of system conditions where KVAH=5 in the unit system of $x_1$ and $x_2$.

The "AND" gates A1 to A4 are thus seen to cause emission of an output signal over channel 35 whenever a pulse signal arrives over a suitable input channel when the system stands at any of the intersections 0, 4; 1, 4; 3, 3; 4, 1 or 4, 0 in FIG. 1. The only other intersections within a single jump distance of the KVAH locus 36 are 2, 4 and 4, 2. Arrival of a KVARH pulse $x_2$ with system in status 4, 2 will jump the system to intersection 4, 3 on locus 36, and warrant the emission of an output signal KVAH pulse. But arrival of an input signal $x_1$ would jump the system from status 4, 2 to status 5, 2 having a position outside the locus 36. The resulting error may be acceptable in some applications.

For analogous reasons arrival of an input pulse $x_1$ when the system status is represented by intersection 2, 4 would jump the status to intersection 3, 4 directly on the locus 36 and warrant sending out a KVAH output pulse; but arrival of an input pulse $x_2$ would jump the system upward in FIGURE 1 from status 2, 4 to intersection 2, 5 a point which could not accurately be reported by an output pulse. The "AND" gates A6 and A5 respectively cause emission of an output signal upon arrival of an input signal $x_2$ from KVARH meter 11 when system status is at intersection 4, 2 and upon arrival of input pulses $x_1$ when system status is 2, 4. Thus "AND" gate A5 has three inputs two of which are derived from bit-units 18 (i.e. $v2$) and 16 (i.e. $u4$); and arrival of an input KWH pulse $x_1$ will then open the entire gate and send an output pulse via "OR" gate 34 out over output channel 35.

Likewise "AND" gate A6 has two inputs which are derived from bit-units 15 (i.e. $u2$) and 19 (i.e. $v4$); and arrival of an input KVARH pulse $x_2$ will then open the entire gate to pass an output pulse via "OR" gate 34 out over channel 35.

Thus "AND" gates A1 to A6 take care of reporting KVAH pulses for all conditions of the system except arrival of a KWH input pulse $x_1$ when system status is intersection 4, 2 and arrival of a KVARH pulse $x_2$ when system status is 2, 4; in FIG. 1. The above-described operation of these "AND" gates may be summarized as follows:

TABLE I

| "AND" gate: | Terminals bearing voltage |
| --- | --- |
| A1 | $x_2$, $u4$ |
| A2 | $x_1$, $v4$ |
| A3 | $x_1$, $u1$, $u2$, $v1$, $v2$ |
| A4 | $x_2$, $u1$, $u2$, $v1$, $v2$ |
| A5 | $x_1$, $u4$, $v2$ |
| A6 | $x_2$, $u2$, $v4$ |

Reporting output for the above-excepted two system conditions is the function of "AND" gates A7 to A12. "AND" gate A11 has two inputs derived from counter bit-units 18 and 16 for a system status intersection 2, 4. At the beginning of any counting period the flip-flop 22 is so positioned that it impresses no energizing voltage on its output line W, and consequently "AND" gates A7 to A10 remain impervious to current from the counter bit-units 14 to 19 to which they are connected, and send no pulses to the output channel through their output lines 23 to 31. A jump to intersection 2, 4 can result from receipt of an $x_1$ (i.e. a KWH) pulse from a system status 1, 4 but none of the "AND" gates A1 to A6 is opened thereby and so no KVAH pulse is sent out. A jump to intersection 2, 4 can result from receipt of an $x_2$ (i.e. a KVARH) pulse when the system is at intersection 2, 3; but again none of the "AND" gates is opened to send a KVAH pulse to output channel 35, when "AND" gates A7 to A10 are closed by zero output on lead W. Arrival of a KVARH input pulse $x_2$ will then be needed to jump to status 2, 5 and cause emission of a KVAH pulse.

But with "AND" gate A11 energized by arrival of an $x_2$ pulse from KVARH meter 11 when system status stands at intersection 2, 4; "AND" gate A11 will be opened to pass a pulse through "OR" gate 20 and its output line 21 to flip-flop 22 and thus impress energizing voltage through its output line 23A to render "AND" gates A7 to A10 pervious to current from the counter bit-units 14 to 19 at any subsequent time while flip-flop 22 stands set.

"AND" gate A12 functions similarly through flip-flop 22 upon arrival of an $x_1$ pulse when bit-units 15 and 19 stand energized. Output channel 35 is connected by a lead 37 to the reset terminals of all the counter bit-units 14 to 19 so that the latter are all reset to zero by emission of a KVAH=5 signal pulse. This starts a new counting period, but this differs from the one so far described in that the "AND" gates A7 to A10 are pervious to current from certain of the bit-units 14 to 19. Thus the system status builds up in FIG. 1 until one of the following four intersections are reached (1) 1, 4; (2) 4, 1; (3) 3, 2; (4) 2, 3. Upon arrival of a KWH pulse $x_1$ under system status (1) thus causing a jump to status 2, 4; "AND" gate A7 passes a KVAH pulse through output channel 35, and a pulse through "OR" gate 38 to the reset terminal of flip-flop 22. This causes a resetting of counter bit-units 14 to 19, and also flip-flop 22 to their original conditions.

Similar results to those just described for (1) in the preceding paragraph are produced by "AND" gate A9 upon arrival of a KVARH pulse $x_2$ under the status (2) 4, 1; i.e. a KVAH output pulse is sent over output channel 35, and a resetting pulse is sent to flip-flop 22 by arrival of pulse $x_2$ jumping the system status to 4, 2.

If the system stands in status (3) 3, 2 arrival of an $x_1$ input pulse jumps the system from that condition to status 4, 2 which causes "AND" gate A8 to send a KVAH pulse out via lead 25 and "OR" gate 34 to output channel 35, and a reset pulse to flip-flop 22 through "OR" gate 38 and lead 39.

Similarly arrival of a KVARH pulse $x_2$ when the system status is (4) 2, 3; jumping system status to intersection 2, 4; causes "AND" gate A10 to transmit a KVAH pulse through its lead 31 and "OR" gate 34 to output channel 35, and a reset pulse over its lead 29 and "OR" gate 38 to flip-flop 22.

The four conditions (1), (2), (3) and (4) just discussed thus cause the "AND" gates A7 to A10 to send out KVAH signals whenever the system jumps to either status intersection 4, 2 or 2, 4 as long as flip-flop 22 stands set, but change the system back to a condition in which jump to status 2, 5 or 5, 2 is required to send out such a signal when flip-flop 22 stands reset. The system is changed alternately from one of these conditions to the other by "AND" gates A11 and A12 with the result that in half its time periods it will under-report the actual KVAH and in the other half will over-report them where the status 2, 4 and the status 4, 2 are involved. In a long succession of KVAH cycles these under-reports and over-reports will average out to give a good enough approximation to true KVAH for most purposes.

The above-described actions of the "AND" gates A7 to A10 may be summarized as follows for the condition in which the flip-flop 22 is set:

TABLE II

| "AND" gate: | Terminals bearing voltage |
| --- | --- |
| A7 | $x_1$, $v1$, $u4$ |
| A8 | $x_1$, $v1$, $v2$, $u2$ |
| A9 | $x_2$, $v4$, $u1$ |
| A10 | $x_2$, $v2$, $u1$, $u2$ |

A system has thus been evolved using only well-known inexpensive circuit components and devoid of moving parts, which will report, by accumulating output signals, the KVAH of an electric system when furnished with the data on KWH meter and KVARH meter readings now customarily available.

In FIG. 1 the curve 36 representing the locus of points which should produce a KVAH pulse intersects the $x_1$ axis at a point corresponding to five $x_1$ pulses and the $x_2$ axis at a point corresponding to five $x_2$ pulses. This permits preferred embodiment to be used as represented by the logical system of FIG. 2 which is relatively simple and practical.

If desired the parameters may be so selected that the curve 36 intersects the axes $x_1$ and $x_2$ at points representing a different number of $x_1$ and $x_2$ pulses. This different number may be a multiple of five or any other number. In any case, logic is provided which produces a KVAH pulse when any combination of $x_1$ and $x_2$ pulses falls on the curve 36 or acceptably close thereto. When successive combinations of $x_1$ and $x_2$ fall on opposite sides of the curve 36, the averaging techniques previously explained may be employed.

As previously noted, the KVAH pulses supplied over the line 35 may be counted over any desired period by a suitable counting device 61 to indicate KVAH for such period.

What is claimed is:

1. In a measuring device for measuring the vector resultant of first and second vector components displaced in phase from each other by a predetermined angle and present in an alternating-current electrical system in the form of alternating quantities, first pulse means effective when energized from the electrical system for producing first pulses at a rate dependent on the magnitude of the first vector component, second pulse means effective when energized from the electrical system for producing second pulses at a rate dependent on the magnitude of the second vector component, and counting means having reset terminal means operable to a reset condition, said counting means having a pair of input terminal means respectively coupled to the outputs of the first and second pulse means, and reset means coupled to the reset terminal means for operating the counting means to reset condition in response to outputs from the counting means upon the occurrence following a reset operation of the counting means of any of plural count combinations of first pulses and second pulses which represent substantially a predetermined magnitude of the vector resultant.

2. A measuring device as claimed in claim 1 wherein the counting means comprises a first counter for counting the first pulses occurring after a reset operation, a second counter for counting the second pulses occurring after a reset operation, and wherein said reset means includes combining means coupled to the first and second counters for producing a reset pulse in response to the arrival of said counters by operation of the first and second pulse means at any of a plurality of different combinations of counts of said first and second pulses, each of said combinations representing substantially said predetermined magnitude of said vector resultant, said counting means being operable to reset condition by said reset pulse.

3. A measuring device as claimed in claim 2 wherein combining means includes means for determining first and second combination of the counts of said first and second pulses which differ by one of said pulses and which represent respectively magnitudes of the vector resultant larger and smaller than said predetermined magnitude for operating the counting means to reset condition alternately in response to occurrence of said first and second combinations.

4. A measuring device as claimed in claim 1 wherein the first pulse means comprises a KWH pulse meter and the second pulse means comprises a KVARH pulse meter, and said plural count combinations comprise the following pair combinations: 5K and 0, 5K and K and 4K and 3K; K being an integer, said counting means starting a new counting cycle upon operation of the reset means.

5. The arrangement specified in claim 4 wherein an output signal is produced also every other time a pair combination 5K and 2K is received.

6. A measuring device as claimed in claim 4 wherein said counting means includes means for producing an output signal each time the respective pulse meters have produced pulses in said pair combinations, and said reset means causes said counting means to start a new counting cycle upon production of said output signal.

7. The arrangement specified in claim 6 wherein means are provided to produce an output signal also every other time that a pair combination 5K and 2K of said first and second pulses occurs.

8. The arrangement specified in claim 6 wherein said counting means comprises a first binary counter having bit units providing output signals of three binary orders, respectively $u1$, $u2$, $u4$, a second binary counter having bit units providing output signals of three binary orders, respectively $v1$, $v2$, $v4$, and "AND" gates connected to be closed against current flow except when output signals are present on the output terminals of said bit units listed in the following Table I, said first pulses and second pulses being output signals $x_1$ and $x_2$ respectively:

TABLE I

| "AND" gate: | Output signals |
|---|---|
| A1 | $x_2$, $u4$ |
| A2 | $x_1$, $u4$ |
| A3 | $x_1$, $u1$, $u2$, $v1$, $v2$ |
| A4 | $x_2$, $u1$, $u2$, $v1$, $v2$ |
| A5 | $x_1$, $u4$, $v2$ |
| A6 | $x_2$, $u2$, $v4$ | an output signal line, the outputs of said "AND" gates being connected to said output signal line and also to said reset terminal means.

9. The arrangement specified in claim 8 wherein supplemental "AND" gates and a supplemental bistable element are provided, and wherein additional "AND" gates are provided connected to be closed against current flow except when energized by the output signals $x_1$, $u2$, $v4$, or the output signals $x_2$, $u4$, $v2$, the outputs of said additional "AND" gates being connected to energize the supplemental bistable element which impresses an output voltage which can open said supplemental "AND" gates which otherwise would be closed if voltage output signals are present on the output terminals listed in the following Table II, the outputs of the "AND" gates listed in Table II being connected to reset the supplemental bistable element and also to the output signal line:

TABLE II

| Supplemental "AND" gate: | Output signals |
|---|---|
| A7 | $x_1$, $u4$, $v1$ |
| A8 | $x_1$, $u2$, $v1$, $v2$ |
| A9 | $x_2$, $u1$, $v4$ |
| A10 | $x_2$, $u1$, $u2$, $v2$ |

10. A measuring device as claimed in claim 1 wherein the reset means includes means responsive to first and second combinations of said first and second pulses which differ by one of said pulses and which represent respectively magnitudes of the vector resultant larger and smaller than said predetermined magnitude for operating the counting means to reset condition alternately in response to occurrence of said first and second combinations.

References Cited

UNITED STATES PATENTS

| 2,889,987 | 6/1959 | Marcus et al. | |
| 2,999,207 | 9/1961 | Quynn. | |
| 3,350,547 | 10/1967 | Brockett. | |
| 3,382,350 | 5/1968 | Yagusic. | |
| 3,348,029 | 10/1967 | Krokar. | |
| 1,647,332 | 11/1927 | Angus | 324—141 XR |
| 2,228,802 | 1/1941 | Yerger | 324—141 XR |

MALCOLM A. MORRISON, Primary Examiner

J. F. RUGGIERO, Assistant Examiner

U.S. Cl. X.R.

324—141